US008773713B2

(12) United States Patent
Kimura

(10) Patent No.: US 8,773,713 B2
(45) Date of Patent: Jul. 8, 2014

(54) IMAGE PROCESSING APPARATUS, IMAGE FORMING SYSTEM AND NON-TRANSITORY COMPUTER READABLE MEDIUM

(75) Inventor: Susumu Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 454 days.

(21) Appl. No.: 12/879,485

(22) Filed: Sep. 10, 2010

(65) Prior Publication Data

US 2011/0228293 A1 Sep. 22, 2011

(30) Foreign Application Priority Data

Mar. 19, 2010 (JP) ................................. 2010-064585

(51) Int. Cl.
G06F 15/00 (2006.01)

(52) U.S. Cl.
USPC ......... 358/1.9; 358/1.16; 358/1.12; 358/3.05; 702/85

(58) Field of Classification Search
USPC .......................................................... 358/1.9
See application file for complete search history.

(56) References Cited

U.S. PATENT DOCUMENTS

| 6,433,885 | B1 * | 8/2002 | Verghese et al. ............. 358/1.15 |
| 7,821,656 | B2 * | 10/2010 | Ito et al. .......................... 358/1.1 |
| 2004/0034761 | A1 | 2/2004 | Schmit |
| 2006/0061794 | A1 | 3/2006 | Ito et al. |
| 2006/0098229 | A1 * | 5/2006 | Matsunaga et al. ............. 358/2.1 |
| 2010/0245878 | A1 * | 9/2010 | Yamada ........................ 358/1.13 |

FOREIGN PATENT DOCUMENTS

| JP | A-11-232077 | 8/1999 |
| JP | A-2000-252814 | 9/2000 |
| JP | A-2001-320271 | 11/2001 |
| JP | A-2002-26721 | 1/2002 |
| JP | A-2002-215593 | 8/2002 |
| JP | A-2004-021426 | 1/2004 |
| JP | A-2005-293184 | 10/2005 |
| JP | A-2005-539293 | 12/2005 |
| JP | A-2006-088433 | 4/2006 |
| WO | WO 2004/017223 A2 | 2/2004 |

OTHER PUBLICATIONS

Jan. 6, 2014 Office Action issued in Chinese Patent Application No. 201010515973.0 (with translation).
Toshinori Sueyoshi, "Reconfigurable System Japan," Ohmsha, Ltd., Aug. 25, 2005, the first edition page (253-267). (English Translation of Relevant Part).
Jan. 28, 2014 Office Action issued in Japanese Application No. 2010-064585 (with English Translation).

* cited by examiner

*Primary Examiner* — Barbara Reinier
*Assistant Examiner* — Brendan McCommas
(74) *Attorney, Agent, or Firm* — Oliff PLC

(57) ABSTRACT

An image processing apparatus including: a calculation portion that calculates a first process time period required for a case where image processes are executed by a reconfiguration process mode, and a second process time period required for a case where the image processes are executed by a pipeline process mode, based on the number of pixels of image information of an input print job and contents of processes of the input print job; and an activation portion that activates a plurality of dynamic reconfigurable processors (DRPs) according to a process mode having a shorter time period in the first process time period and the second process time period.

9 Claims, 18 Drawing Sheets

FIG. 6

|  | L(CLOCK) | INPUT DEPENDENCE FLAG | OUTPUT DEPENDENCE FLAG |
|---|---|---|---|
| COLOR CONVERSION PROCESS | 3 | 0 | 1 |
| FILTER PROCESS | 3 | 0 | 1 |
| ENLARGEMENT PROCESS | 5 | 0 | 1 |
| REDUCTION PROCESS | 5 | 1 | 0 |
| OH | 200 |  |  |

PROCESS TIME TABLE

FIG. 9

<CALCULATING EXPRESSION OF RECONFIGURATION PROCESS MODE>
$Y1 = (P1 \times L1) + OH$
$\quad + (P2 \times L2) + OH \quad \cdot \cdot \cdot (1)$
$\quad + (P3 \times L3) + OH$ P=NUMBER OF PIXELS TO BE PROCESSED
L=PROCESS TIME PERIOD PER ONE PIXEL (UNIT: CLOCK)
OH=OVERHEAD TIME PERIOD IN CASE OF RECONFIGURATION (UNIT: CLOCK)

<CALCULATING EXPRESSION OF PIPELINE PROCESS MODE>
$Y2 = P_{max} \times 3 \quad \cdot \cdot \cdot (2)$
$P_{max} = MAX(P1 \times L1, P2 \times L2, P3 \times L3)$

FIG. 10

|  | L | INPUT DEPENDENCE FLAG | OUTPUT DEPENDENCE FLAG | NUMBER OF INPUT PIXELS | NUMBER OF OUTPUT PIXELS | PROCESS TIME PERIOD |
|---|---|---|---|---|---|---|
| COLOR CONVERSION PROCESS | 3 | 0 | 1 | 100 | 100 | 300 |
| FILTER PROCESS | 3 | 0 | 1 | 100 | 100 | 300 |
| ENLARGEMENT PROCESS | 5 | 0 | 1 | 100 | 130 | 650 |

ENLARGEMENT FACTOR : 1.3

TOTAL PROCESS TIME PERIOD=(L×INPUT DEPENDENCE FLAG×NUMBER OF INPUT PIXELS)
 +(L×OUTPUT DEPENDENCE FLAG×NUMBER OF OUTPUT PIXELS)

Y1(RECONFIGURATION PROCESS MODE)=TOTAL OF EACH PROCESS TIME PERIOD+OH×3    Y1  1850
Y2(PIPELINE PROCESS MODE)=MAXIMUM VALUE OF PROCESS TIME PERIOD×3              Y2  1950

Y1<Y2  →  ACTIVATE DRP BY RECONFIGURATION PROCESS MODE

FIG. 11
<RECONFIGURATION PROCESS MODE>
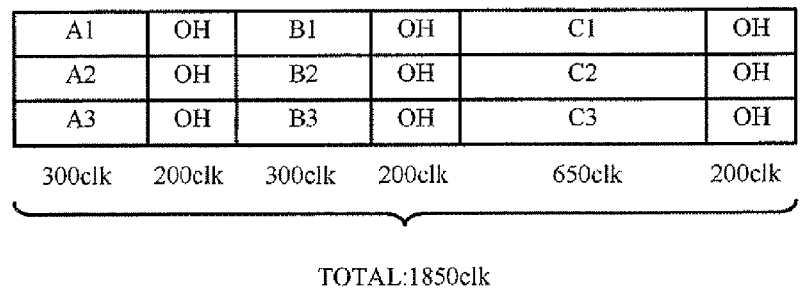
TOTAL:1850clk
<PIPELINE PROCESS MODE>
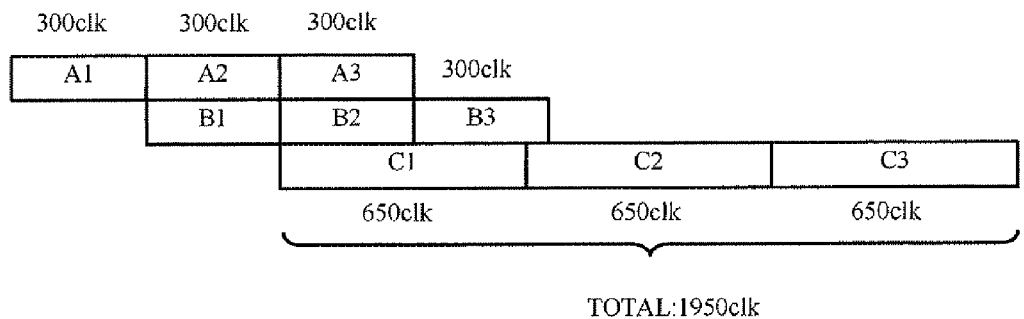
TOTAL:1950clk
WHEN RECONFIGURATION PROCESS MODE IS MORE ADVANTAGEOUS THAN PIPELINE PROCESS MODE

FIG. 12

| | L | INPUT DEPENDENCE FLAG | OUTPUT DEPENDENCE FLAG | NUMBER OF INPUT PIXELS | NUMBER OF OUTPUT PIXELS | PROCESS TIME PERIOD |
|---|---|---|---|---|---|---|
| COLOR CONVERSION PROCESS | 3 | 0 | 1 | 100 | 100 | 300 |
| FILTER PROCESS | 3 | 0 | 1 | 100 | 100 | 300 |
| ENLARGEMENT PROCESS | 5 | 0 | 1 | 100 | 110 | 550 |

ENLARGEMENT FACTOR : 1.1

TOTAL PROCESS TIME PERIOD=(L×INPUT DEPENDENCE FLAG×NUMBER OF INPUT PIXELS) +(L×OUTPUT DEPENDENCE FLAG×NUMBER OF OUTPUT PIXELS)

Y1(RECONFIGURATION PROCESS MODE)=TOTAL OF EACH PROCESS TIME PERIOD+OH×3      Y1  1750
Y2(PIPELINE PROCESS MODE)=MAXIMUM VALUE OF PROCESS TIME PERIOD×3               Y2  1650

Y1>Y2  →  ACTIVATE DRP BY PIPELINE PROCESS MODE

FIG. 13
<RECONFIGURATION PROCESS MODE>
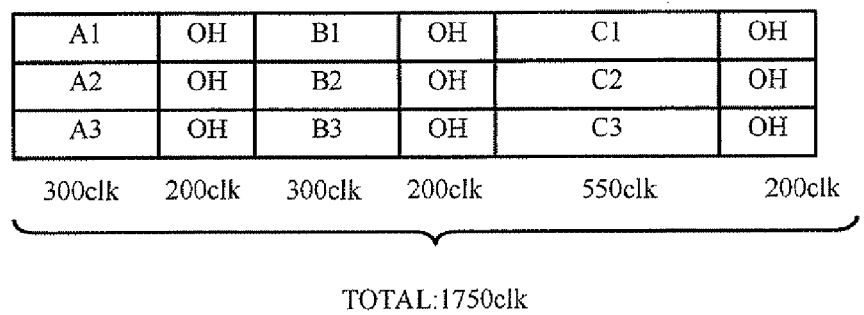
TOTAL:1750clk
<PIPELINE PROCESS MODE>
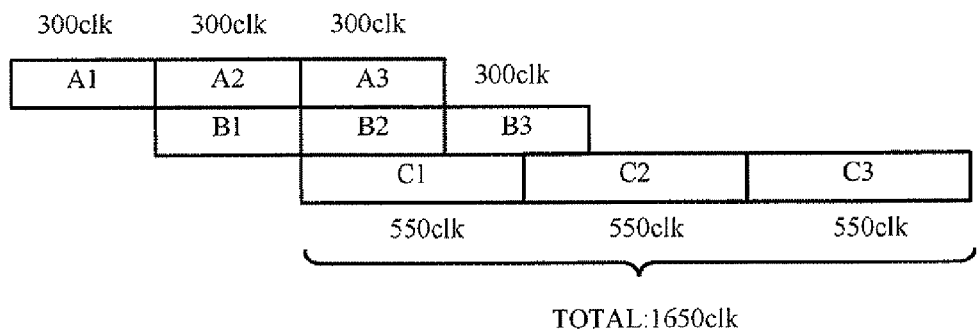
TOTAL:1650clk
WHEN PIPELINE PROCESS MODE IS MORE ADVANTAGEOUS
THAN RECONFIGURATION PROCESS MODE

FIG. 14

<CALCULATING EXPRESSION OF RECONFIGURATION PROCESS MODE>
$Y1=\{(P1 \times L1)+OH$
  $+(P2 \times L2)+OH$
  $+(P3 \times L3)+OH\} \times (N \div D) \cdots (3)$ P=NUMBER OF PIXELS TO BE PROCESSED
L=PROCESS TIME PERIOD PER ONE PIXEL (UNIT: CLOCK)
OH=OVERHEAD TIME PERIOD IN CASE OF RECONFIGURATION (UNIT: CLOCK)
N=NUMBER OF PAGES TO BE PROCESSED
D=NUMBER OF PIPELINE STAGES <CALCULATING EXPRESSION OF PIPELINE PROCESS MODE>
$Y2=(P1 \times L1)+(P2 \times L2)+\{(P_{max} \times 3) \times (N \div D)\} \cdots (4)$
$P_{max}=MAX(P1 \times L1, P2 \times L2, P3 \times L3)$

FIG. 15

| | L | INPUT DEPENDENCE FLAG | OUTPUT DEPENDENCE FLAG | NUMBER OF INPUT PIXELS | NUMBER OF OUTPUT PIXELS | PROCESS TIME PERIOD |
|---|---|---|---|---|---|---|
| COLOR CONVERSION PROCESS | 3 | 0 | 1 | 100 | 100 | 300 |
| FILTER PROCESS | 3 | 0 | 1 | 100 | 100 | 300 |
| ENLARGEMENT PROCESS | 5 | 0 | 1 | 100 | 130 | 650 |

ENLARGEMENT FACTOR : 1.3
NUMBER OF PAGES : 90
NUMBER OF STAGES : 3

TOTAL PROCESS TIME PERIOD=(L×INPUT DEPENDENCE FLAG×NUMBER OF INPUT PIXELS)
 +(L×OUTPUT DEPENDENCE FLAG×NUMBER OF OUTPUT PIXELS)

Y1(RECONFIGURATION PROCESS MODE)=(TOTAL OF EACH PROCESS TIME PERIOD+OH×3)
 ×(NUMBER OF PAGES÷NUMBER OF STAGES)

Y2(PIPELINE PROCESS MODE)=MAXIMUM VALUE OF PROCESS TIME PERIOD
 +(MAXIMUM VALUE OF PROCESS TIME PERIOD×3)
 ×(NUMBER OF PAGES÷NUMBER OF STAGES)

Y1  55500
Y2  59100

Y1<Y2  →  ACTIVATE DRP BY RECONFIGURATION PROCESS MODE

FIG. 16
<RECONFIGURATION PROCESS MODE>
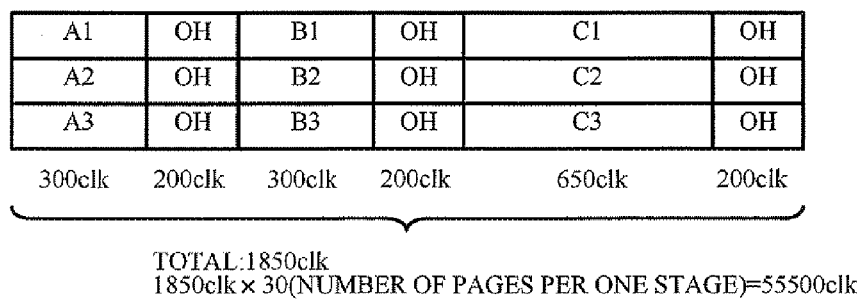
TOTAL:1850clk
1850clk × 30(NUMBER OF PAGES PER ONE STAGE)=55500clk
<PIPELINE PROCESS MODE>
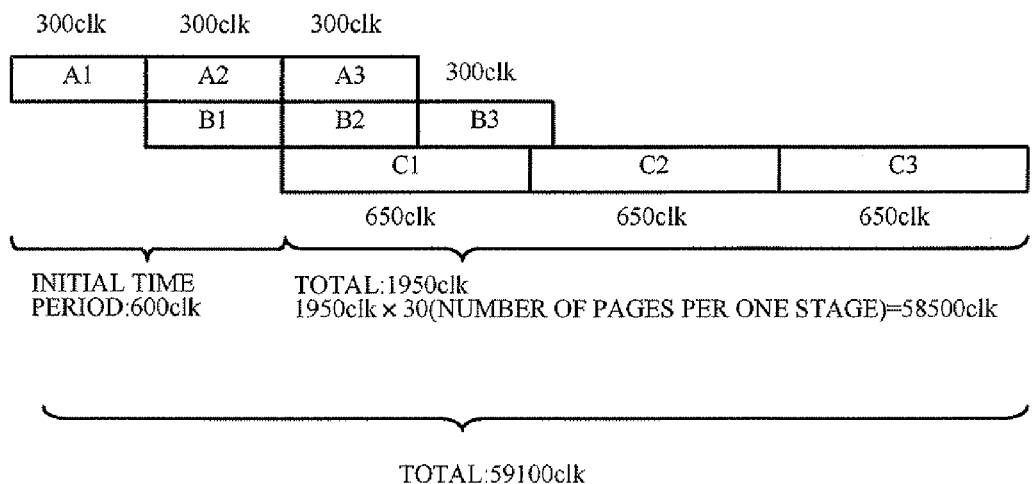
INITIAL TIME
PERIOD:600clk
TOTAL:1950clk
1950clk × 30(NUMBER OF PAGES PER ONE STAGE)=58500clk
TOTAL:59100clk
WHEN RECONFIGURATION PROCESS MODE IS MORE
ADVANTAGEOUS THAN PIPELINE PROCESS MODE

FIG. 17

| | L | INPUT DEPENDENCE FLAG | OUTPUT DEPENDENCE FLAG | NUMBER OF INPUT PIXELS | NUMBER OF OUTPUT PIXELS | PROCESS TIME PERIOD |
|---|---|---|---|---|---|---|
| COLOR CONVERSION PROCESS | 3 | 0 | 1 | 100 | 100 | 300 |
| FILTER PROCESS | 3 | 0 | 1 | 100 | 100 | 300 |
| ENLARGEMENT PROCESS | 5 | 0 | 1 | 100 | 110 | 550 |

ENLARGEMENT FACTOR : 1.1
NUMBER OF PAGES : 90
NUMBER OF STAGES : 3

TOTAL PROCESS TIME PERIOD=(L×INPUT DEPENDENCE FLAG×NUMBER OF INPUT PIXELS)
  +(L×OUTPUT DEPENDENCE FLAG×NUMBER OF OUTPUT PIXELS)

Y1(RECONFIGURATION PROCESS MODE)=(TOTAL OF EACH PROCESS TIME PERIOD+OH×3)
  ×(NUMBER OF PAGES÷NUMBER OF STAGES)

Y2(PIPELINE PROCESS MODE)=MAXIMUM VALUE OF PROCESS TIME PERIOD
  +(MAXIMUM VALUE OF PROCESS TIME PERIOD×3)
  ×(NUMBER OF PAGES÷NUMBER OF STAGES)

Y1    52500
Y2    50100

Y1>Y2  →  ACTIVATE DRP BY PIPELINE PROCESS MODE

FIG. 18

<RECONFIGURATION PROCESS MODE>

| A1 | OH | B1 | OH | C1 | OH |
|----|----|----|----|----|----|
| A2 | OH | B2 | OH | C2 | OH |
| A3 | OH | B3 | OH | C3 | OH |

300clk　　200clk　　300clk　　200clk　　550clk　　200clk

TOTAL:1750clk
1750clk×30(NUMBER OF PAGES PER ONE STAGE)=52500clk

<PIPELINE PROCESS MODE>

300clk　　300clk　　300clk

| A1 | A2 | A3 | 300clk | | |
|----|----|----|--------|--|--|
|    | B1 | B2 | B3     | | |
|    |    | C1 | C2 | C3 | |

550clk　　550clk　　550clk

INITIAL TIME    TOTAL:1650clk
PERIOD:600clk   1650clk×30(NUMBER OF PAGES PER ONE STAGE)=49500clk TOTAL:50100clk WHEN PIPELINE PROCESS MODE IS MORE ADVANTAGEOUS
THAN RECONFIGURATION PROCESS MODE

IMAGE PROCESSING APPARATUS, IMAGE FORMING SYSTEM AND NON-TRANSITORY COMPUTER READABLE MEDIUM

CROSS-REFERENCE TO RELATED APPLICATION

This application is based on and claims priority under 35 USC 119 from Japanese Patent Application No. 2010-064585 filed on Mar. 19, 2010.

BACKGROUND (i) Technical Field

The present invention relates to an image processing apparatus, an image forming system, and a non-transitory computer readable medium.

(ii) Related Art

The operation of an image forming apparatus is controlled by a controller. A drawing processor that is called a dynamic reconfigurable processor (hereinafter simply referred to as "DRP") is installed in the controller. The DRP fulfills various functions relating to an image process by the control of a CPU (Central Processing Unit).

The CPU activates the DRP by either of a pipeline process mode or a reconfiguration process mode. When the DRPs are configured in plural stages for example, the CPU causes each DRP to fulfill a single image process function in the pipeline process mode. Therefore, when image information is input to the image forming apparatus, a single image process is executed with the single DRP. Then, when the single image process is terminated, a next image process is executed with the single DRP. On the other hand, in the reconfiguration process mode, when image information is input to the image forming apparatus, the CPU sequentially switches image process functions for the single DRP, and hence the single DRP executes image processes.

SUMMARY

According to an aspect of the present invention, there is provided an image processing apparatus including: a calculation portion that calculates a first process time period required for a case where image processes are executed by a reconfiguration process mode, and a second process time period required for a case where the image processes are executed by a pipeline process mode, based on the number of pixels of image information of an input print job and contents of processes of the input print job; and an activation portion that activates a plurality of dynamic reconfigurable processors (DRPs) according to a process mode having a shorter time period in the first process time period and the second process time period.

BRIEF DESCRIPTION OF THE DRAWINGS

Exemplary embodiments of the present invention will be described in detail based on the following figures, wherein:

FIG. 6 is a diagram showing a process timetable;

FIG. 9 is a diagram showing an example of calculating expressions of a first process time period and a second process time period;

FIG. 10 is a diagram showing an concrete example of the first process time period and the second process time period when the reconfiguration process mode becomes advantageous;

FIG. 11 is a schematic diagram when the reconfiguration process mode becomes advantageous;

FIG. 12 is a diagram showing an concrete example of the first process time period and the second process time period when the pipeline process mode becomes advantageous;

FIG. 13 is a schematic diagram when the pipeline process mode becomes advantageous;

FIG. 14 is a diagram showing another example of calculating expressions of the first process time period and the second process time period;

FIG. 15 is a diagram showing another concrete example of the first process time period and the second process time when the reconfiguration process mode becomes advantageous;

FIG. 16 is another schematic diagram when the reconfiguration process mode becomes advantageous;

FIG. 17 is a diagram showing another concrete example of the first process time period and the second process time period when the pipeline process mode becomes advantageous; and FIG. 18 is another schematic diagram when the pipeline process mode becomes advantageous.

DETAILED DESCRIPTION

A description will now be given, with reference to the accompanying drawings, of an exemplary embodiment of the present invention.

First Exemplary Embodiment

Figure 1:
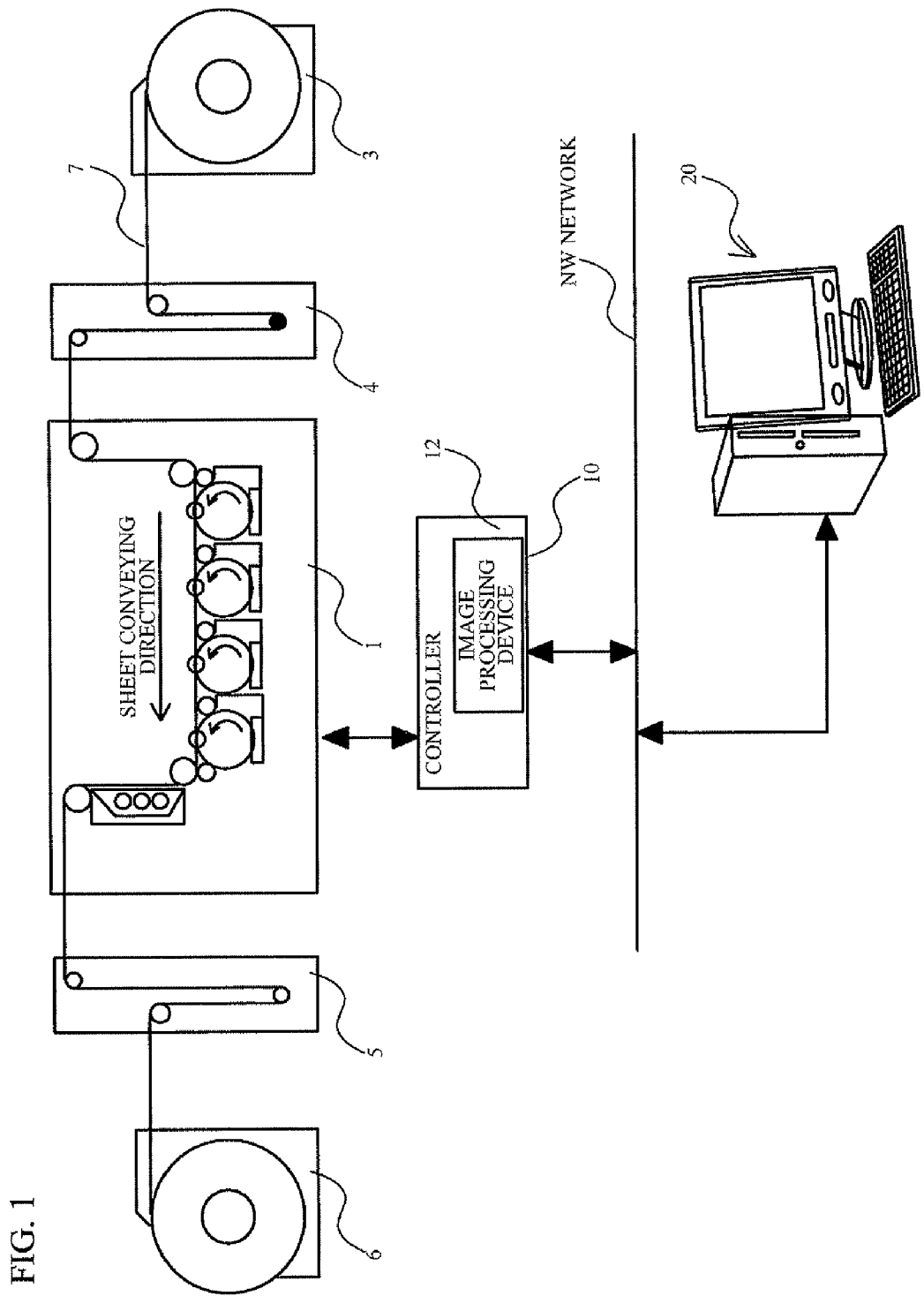
FIG. 1 is a diagram showing an example of the construction of an image forming system.

FIG. 1 is a diagram showing an example of the construction of an image forming system. The image forming system includes an image forming apparatus 1, a preprocessing device 3, buffer devices 4 and 5, a post-processing device 6, a controller 10, and an outputting device 20, as shown in FIG. 1. The controller 10 includes an image processing device 12.

The image forming apparatus 1 forms an image according to image information on a recording medium 7 such as a recording sheet, based on the control of the controller 10. For instance, a printer functions as the image forming apparatus 1. The image information is output from the image processing device 12. The recording medium 7 may be plastic, and the material thereof is not limited.

The preprocessing device 3 feeds the recording medium 7 on which the image has not been printed yet, to the image forming apparatus 1. The preprocessing device 3 holds the recording medium 7 wound like a roll. The post-processing device 6 receives the recording medium 7 fed from the image forming apparatus 1, and winds up the recording medium 7 like a roll. The buffer devices 4 and 5 absorbs a difference between a feeding speed of the recording medium 7 in the preprocessing device 3 and the post-processing device 6, and a feeding speed of the recording medium 7 in the image forming apparatus 1. By buffer devices 4 and 5, constant tension is kept to the recording medium 7, and the slack of the recording medium 7 is controlled.

The outputting device 20 generates a print job to form the image on the recording medium 7 with the image forming apparatus 1, based on the operation of a user. The outputting device 20 outputs the print job to the image processing device 12 via a network NW. For instance, a personal computer functions as the outputting device 20. The controller 10 receives the print job output from the outputting device 20. The controller 10 converts the print job into the image information of a raster type with which the image forming apparatus 1 is capable of forming the image. The controller 10 outputs the image information to the image forming apparatus 1. It should be noted that the controller 10 may be configured inside the image forming apparatus 1.

Figure 2:
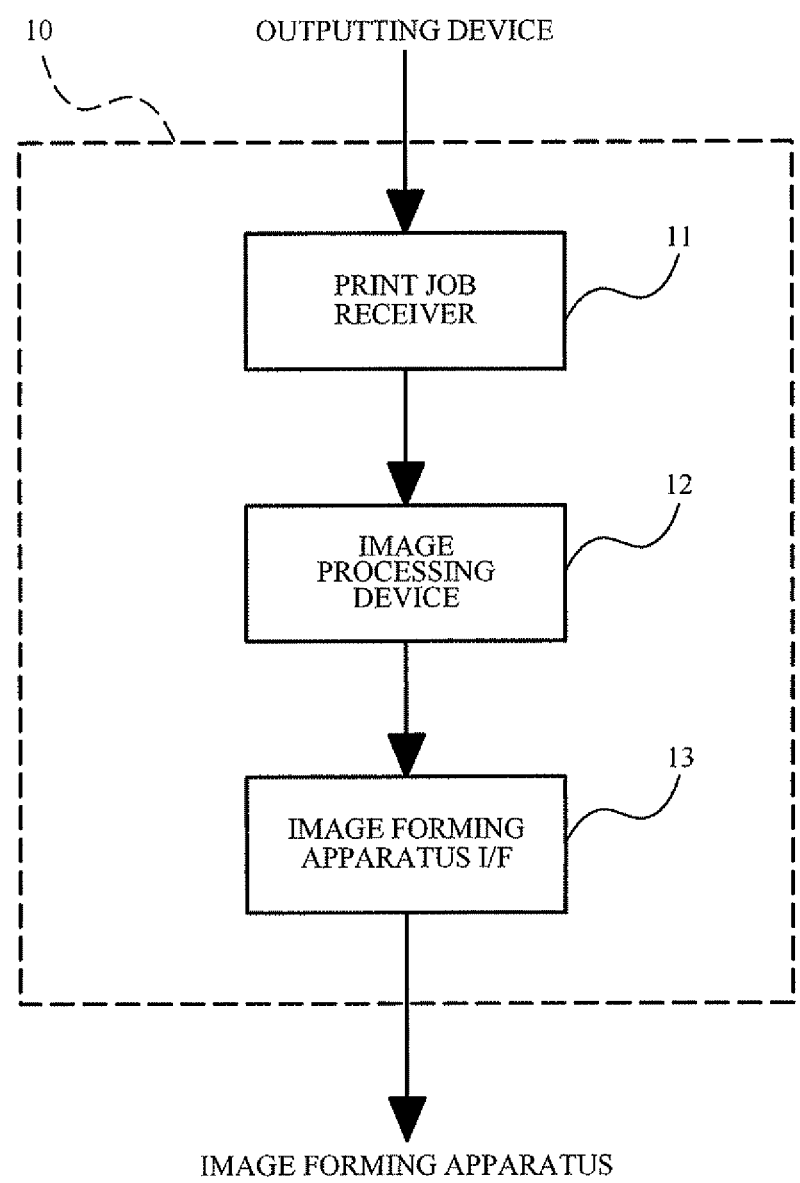
FIG. 2 is a block diagram of a controller.

FIG. 2 is a block diagram of the controller 10. The controller 10 includes a print job receiver 11, the image processing device 12, and an image forming apparatus interface (I/F) 13, as shown in FIG. 2.

The print job receiver 11 receives the print job output from the outputting device 20. The image processing device 12 converts the print job received by the print job receiver 11 into the image information of the raster type, and executes various image processes to the image information. The image forming apparatus interface 13 outputs the image information to which various image processes are executed, to the image forming apparatus 1.

Figure 3:
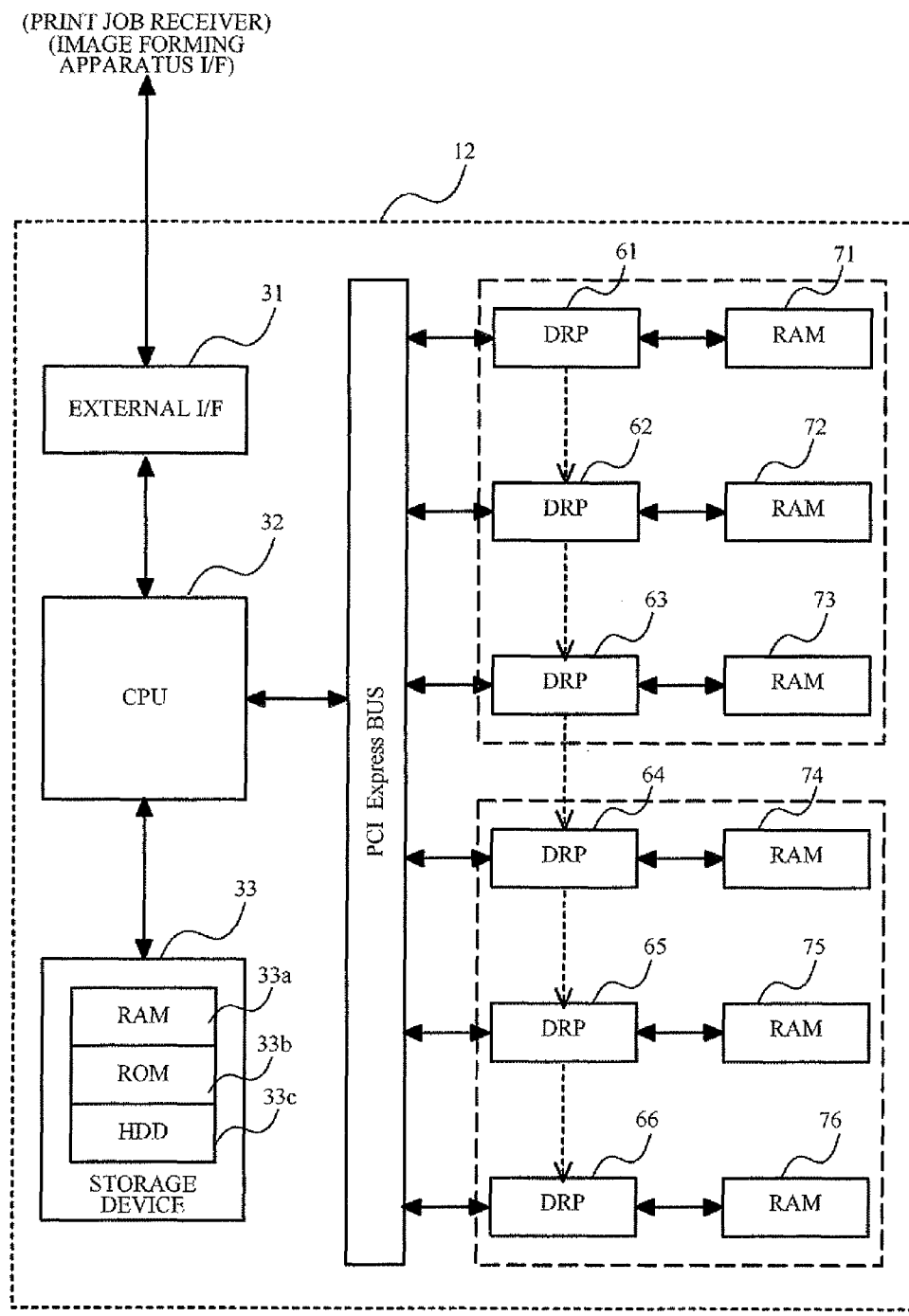
FIG. 3 is a diagram showing the hardware construction of an image processing apparatus.

FIG. 3 is a diagram showing the hardware construction of the image processing device 12. The image processing device 12 includes: a CPU 32; RAMs 33a and 71 to 76 such as a SRAM (Static Random Access Memory), a DRAM (Dynamic RAM), a SDRAM (Synchronous DRAM), or a NVRAM (Non Volatile RAM), a DDR2SDRAM (Double Data Rate 2 SDRAM); a ROM (Read Only Memory) 33B such as a flash memory; a HDD (Hard Disk Drive) 33c; dynamic reconfigurable processors (DRPs) 61 to 66 connected to a PCI Express bus like a daisy chain; and an external interface (I/F) 31. The CPU 32 and the DRPs 61 to 66 are connected to each other via the PCI Express bus as a switch.

When the CPU 32 as a computer receives the print job, the CPU 32 converts the print job into the image information and activates the DRPs 61 to 66. The CPU 32 loads a given program stored into a storage device 33 such as the ROM 33b or the HDD 33c, and executes calculation according to the given program, so that the activation of the DRPs 61 to 66 is realized. It should be noted that the given program may be a program according to a flowchart described later. The given program may be stored into a portable storage medium such as a CD-ROM, and be provided to the CPU 32.

Figure 4:
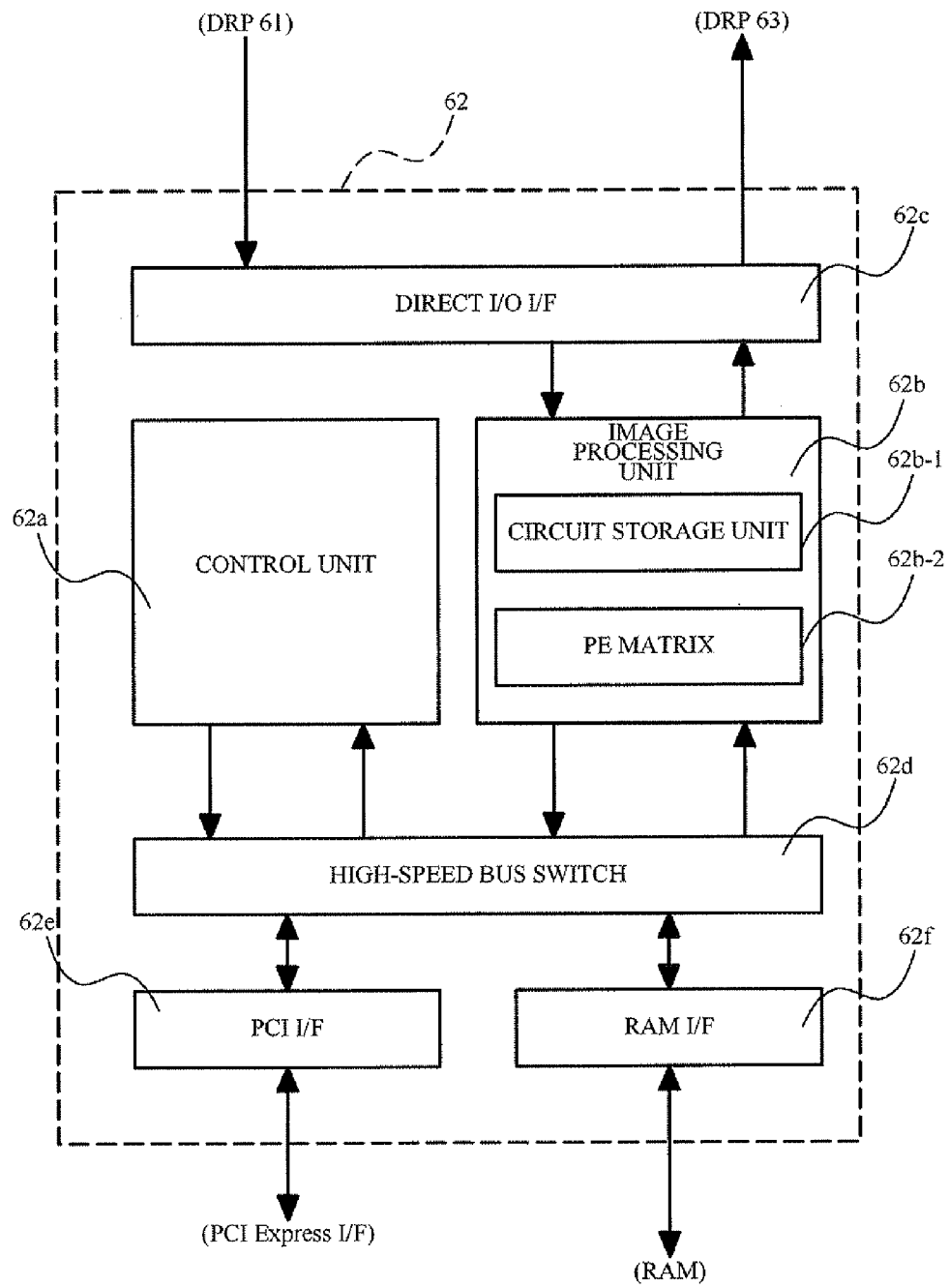
FIG. 4 is a block diagram of a dynamic reconfigurable processor (DRP)

FIG. 4 is a block diagram of a DRP 62. Since the DRPs 61, 63 to 66 has the same construction as the DRP 62, the description thereof will be omitted. The DRP 62 includes a control unit 62a, an image processing unit 62b, a direct I/O (Input/Output) interface 62c, a high-speed bus switch 62d, a PCI interface (I/F) 62e, and a RAM interface (I/F) 62f.

The control unit 62a operates based on the control from the CPU 32. The image processing unit 62b rewrite a PE (Processing Element) matrix 62b-2 based on the control of the control unit 62a, and realizes various image process functions. Circuits relating to the image processes to be realized are stored into a circuit storage unit 62b-1 in the image processing unit 62b. The PE matrix 62b-2 is processing elements for dynamically reconfiguring the circuits.

The direct I/O I/F 62c receives the image information from the DRP 61, and outputs the image information to the image processing unit 62b. The direct I/O I/F 62c outputs the image information in which various image processes are executed with the image processing unit 62b, to the DRP 63. The direct I/O I/F 62c transmits the image information from the DRP 61 to the DRP 63 via the DRP 62 by a pipeline process mode. As a result, the image process is sequentially executed to the image information with each of the DRPs 61 to 63.

The high-speed bus switch 62d switches information channels between the control unit 62a or the image processing unit 62b, and the PCI I/F 62e or the RAM I/F 62f, at high speed. The PCI I/F 62e transmits and receives information to/from other circuit connected to the outside. The RAM I/F 62f transmits and receives information to/from the RAM 72.

Figure 5:
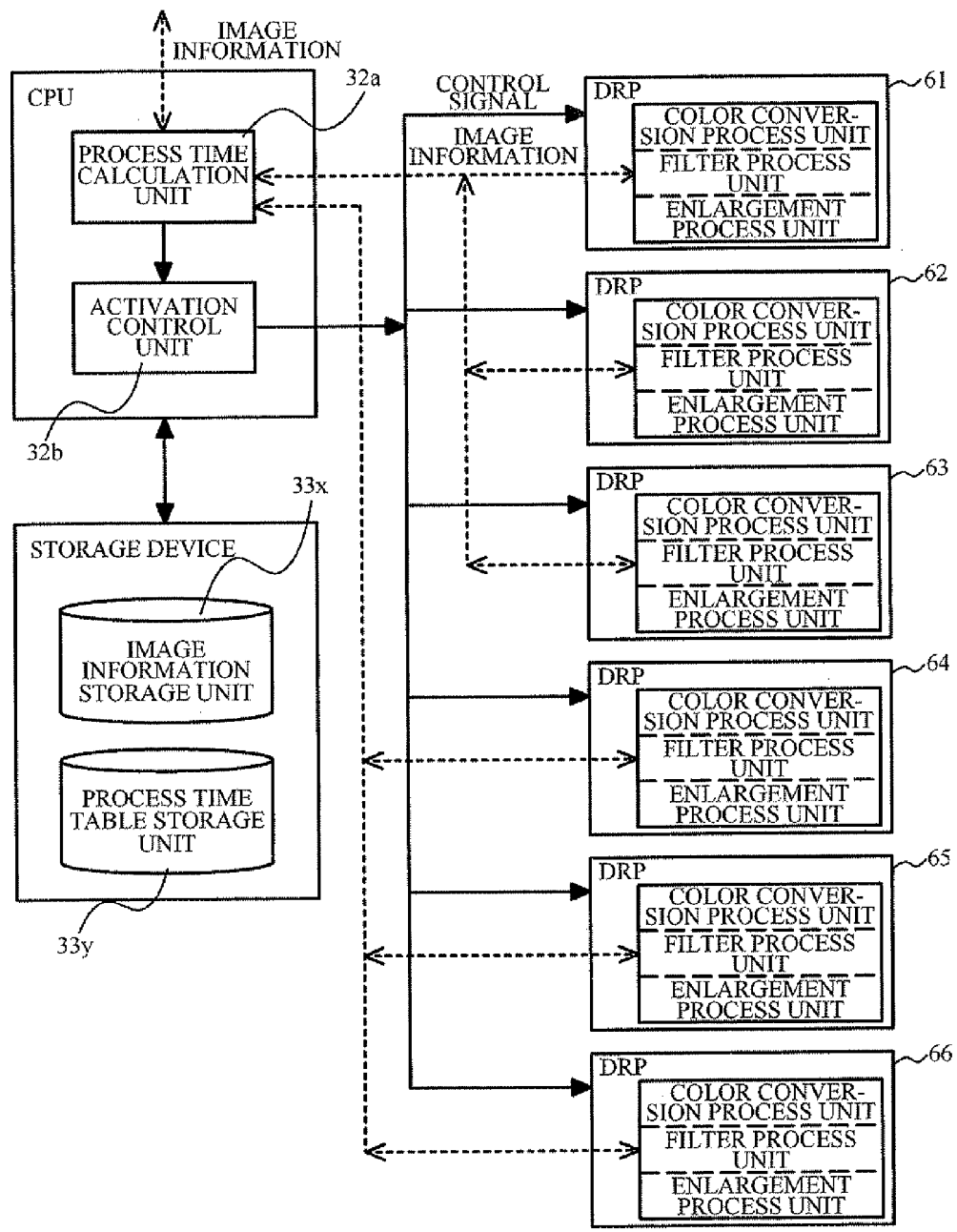
FIG. 5 is a functional block diagram of the image processing apparatus in a reconfiguration process mode.

FIG. 5 is a functional block diagram of the image processing device 12 in a reconfiguration process mode, FIG. 6 is a diagram showing a process time table.

The CPU 32 includes a process time calculation unit 32a, and an activation control unit 32b. The process time calculation unit 32a and the activation control unit 32b are realized by a program based on a flowchart described later.

The process time calculation unit 32a calculates, based on the number of pixels of the image information of the input print job, a first process time period required for the case where the image processes are executed by the reconfiguration process mode, and a second process time period required for the case where the image processes are executed by a pipeline process mode. The process time calculation unit 32a divides the image information page by page, if necessary.

The activation control unit 32b activates the DRPs 61 to 66 according to a process mode having a shorter time period in either of the first process time period and the second process time period. FIG. 5 shows the case where the first process time period is shorter than the second process time period, so that the DRPs 61 to 66 are activated by the reconfiguration process mode.

In FIG. 5, the DRPs 61 to 66 realize color conversion process units, filter process units, and enlargement process units. The color conversion process units, the filter process units, and the enlargement process units sequentially switch by control signals from the activation control unit 32b.

For example, when the image information is input to each of the DRPs 61 to 66, the DRPs 61 to 66 first realize the color conversion process units. Therefore, color conversion process is executed to the image information. When the color conversion process to the image information has completed, after given switching time has elapsed, the DRPs 61 to 66 realize the filter process units. The image information to which the color conversion process has been executed is stored into corresponding RAMs 71 to 76 during the given switching time.

Next, filter process is executed to the image information which is stored into the RAMs 71 to 76, and to which the color conversion process has been executed. When the filter process to the image information has completed, after given switching time has elapsed, the DRPs 61 to 66 realize the enlargement process units. The image information to which the filter process has been executed is stored into corresponding RAMs 71 to 76 during the given switching time again.

Next, enlargement process is executed to the image information, which is stored into the RAMs 71 to 76, and to which the filter process has been executed, and then the image information to which the enlargement process has been executed is output to the CPU 32.

The storage device 33 includes an image information storage unit 33x, and a process timetable storage unit 33y. The image information storage unit 33x and the process timetable storage unit 33y are realized by the above-mentioned ROM 33b or HDD 33c. The image information storage unit 33x stores the image information. The image information is called up from the CPU 32, and transmitted to each of the DRPs 61 to 66.

The process timetable storage unit 33$y$ stores a process timetable. The process time table is composed of a process time period L, an input dependence flag, and an output dependence flag, and so on which are requested by each image process (e.g. the color conversion process, the filter process, or the like), as shown in FIG. 6. For example, FIG. 6 shows that three clocks per one pixel are requested for the color conversion process. Also, FIG. 6 shows that "OH" is an overhead. The overhead is switching time of the image process function after a single image process is completed and until a next image process is started. FIG. 6 shows that 200 clocks are requested as the overhead after the color conversion process is completed and until the filter process can be started. It should be noted that the process time requested for each image process may use a calculated value as a setting value, or an actual measurement value.

Figure 7:
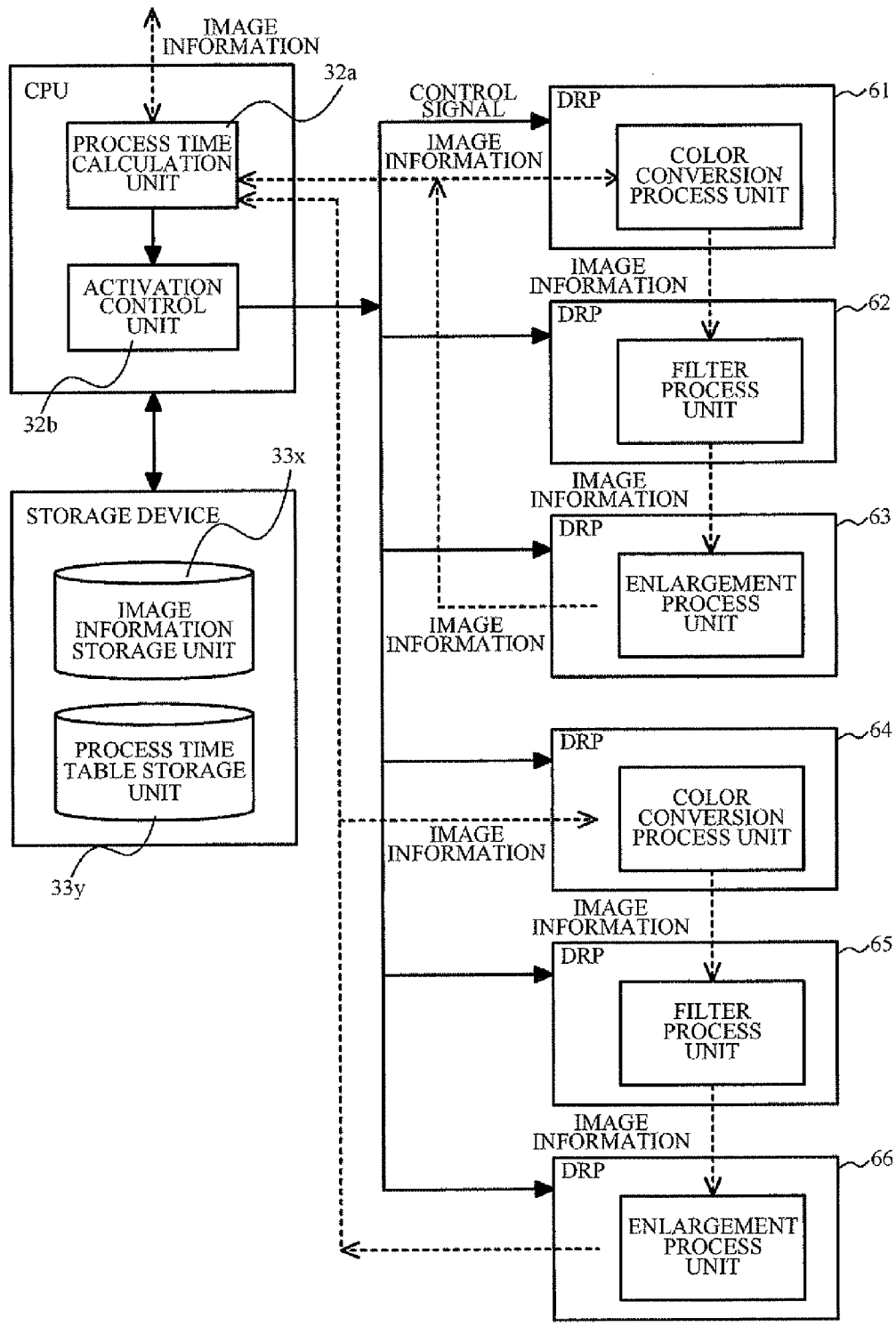
FIG. 7 is a functional block diagram of the image processing apparatus in a pipeline process mode.

FIG. 7 is a functional block diagram of the image processing device 12 in a pipeline process mode. The DRPs 61 to 63 and the DRPs 64 to 66 are composed of three stages respectively. A single circuit board is composed of the DRPs 61 to 63, and another single circuit board is composed of the DRPs 64 to 66. The DRPs 61 and 64, which are a first stage, realize the color conversion process units. The DRPs 62 and 65, which are a second stage, realize the filter process units. The DRPs 63 and 66, which are a third, stage realize the enlargement process units. Therefore, to the image information output from the CPU 32, the color conversion process is first executed with the DRP 61, the filter process is then executed with the DRP 62, and the enlargement process is further executed with the DRP 63. The same image processes are also executed to the image information output to the DRPs 64 to 66. Thus, the image processes are sequentially executed by the pipeline process mode. It should be noted that the number of DRPs to be mounted on the single circuit board may be changed arbitrarily. Also, the number of circuit boards is not limited to two as shown in FIG. 7.

Next, a description will now be given of the operation of the image processing device 12 according to the present exemplary embodiment.

Figure 8:
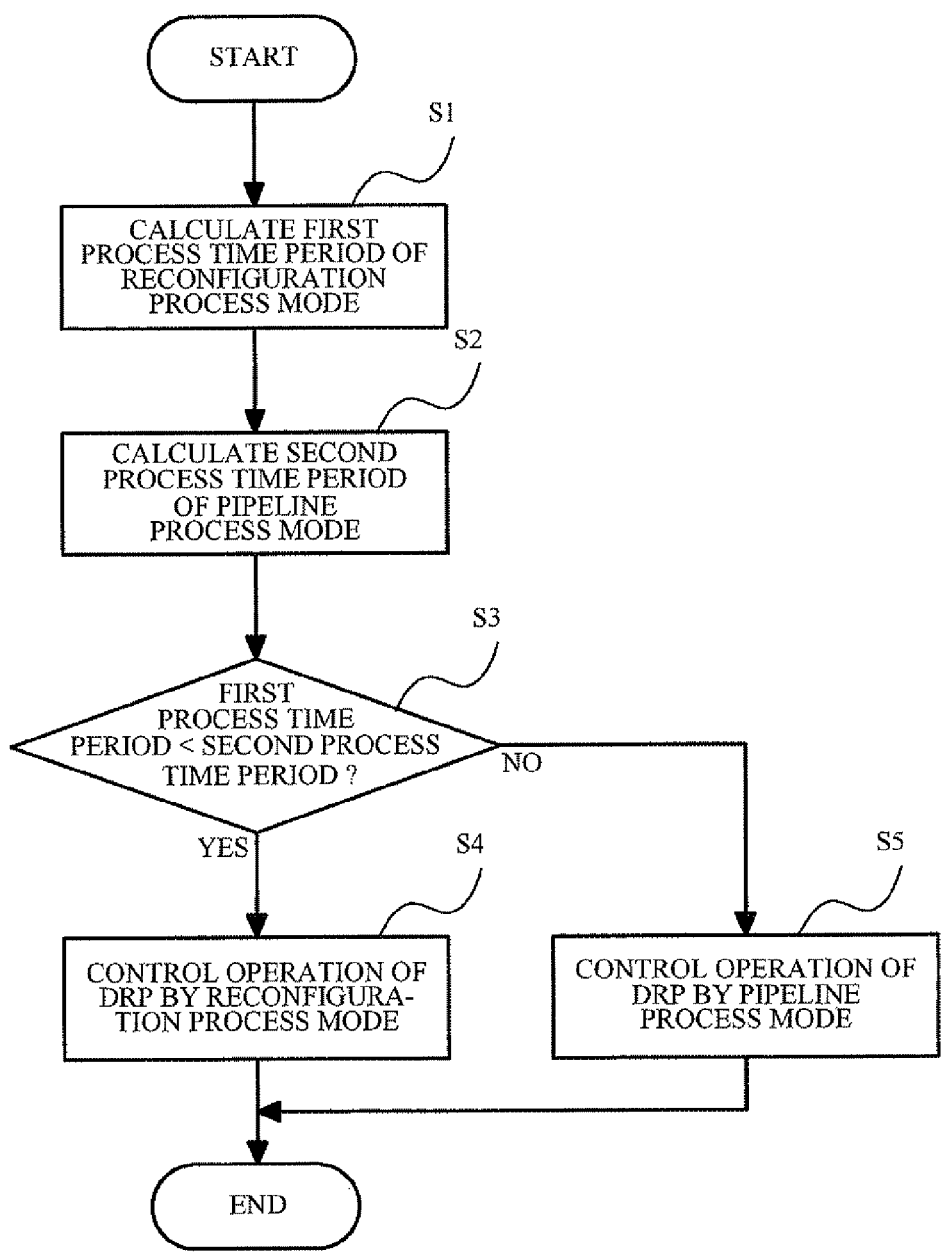
FIG. 8 is a flowchart showing an example of the operation of a CPU.

FIG. 8 is a flowchart showing an example of the operation of the CPU 32. FIG. 9 is a diagram showing an example of calculating expressions of the first process time period and the second process time period.

When the process time calculation unit 32$a$ in the CPU 32 receives the print job, the process time calculation unit 32$a$ selects necessary process (e.g. the color conversion process, the filter process, the enlargement process, or the like) from the print job, and calculates the first process time period of the reconfiguration process mode as show in FIG. 8 while referring to the process timetable storage unit 33$y$ (step S1). The first process time period is calculated by an expression (1) shown in FIG. 9. According to the expression (1), process time periods L1 to L3, each of which shows a process time period per one pixel, are multiplied by the number of pixels to be processed P1 to P3, each of which shows the number of pixels to be processed for each image process function, respectively. And then, the respective overheads are added to the results of the multiplication. A value in which all the addition results are totaled becomes a first process time period Y1.

Next, the process time calculation unit 32$a$ calculates the second process time period of the pipeline process mode (step S2). The second process time period is calculated by an expression (2) shown in FIG. 9. According to the expression (2), process time periods L1 to L3, each of which shows a process time period per one pixel, are multiplied by the number of pixels to be processed P1 to P3, each of which shows the number of pixels to be processed for each image process function, respectively. And then, a maximum value is selected from the results of the multiplication. A value in which the selected maximum value is multiplied by the number of stages of the DRPs (e.g. three times) becomes a second process time period Y2. That is, the second process time period Y2 is based on the image process in which it takes the longest time.

Next, the process time calculation unit 32$a$ judges whether the first process time period is shorter than the second process time period (step S3). When the process time calculation unit 32$a$ judges that the first process time period is shorter than the second process time period (YES in step S3), the activation control unit 32$b$ activates the DRPs 61 to 66 by the reconfiguration process mode (step S4). On the other hand, when the process time calculation unit 32$a$ judges that the first process time period is longer than the second process time period (NO in step S3), the activation control unit 32$b$ activates the DRPs 61 to 66 by the pipeline process mode (step S5).

Here, a description will now be given of concrete examples of processes of the above-mentioned steps S3 to S5, with reference to FIGS. 10 to 13.

FIG. 10 is a diagram showing an concrete example of the first process time period and the second process time period when the reconfiguration process mode becomes advantageous. FIG. 11 is a schematic diagram when the reconfiguration process mode becomes advantageous. FIG. 12 is a diagram showing an concrete example of the first process time period and the second process time period when the pipeline process mode becomes advantageous. FIG. 13 is a schematic diagram when the pipeline process mode becomes advantageous.

For example, in the color conversion process shown in FIG. 10, the number of clocks requested for processing one pixel is 3 clocks. In this case, the input dependence flag is "0", and hence the process time period becomes "0" even if the number of input pixels is multiplied by the "L" (i.e., 3 clocks). However, since the output dependence flag is "1", the output dependence flag and the number of output pixels "100" is multiplied by the "L" (i.e., 3 clocks), so that the process time period becomes 300 clocks. Similarly, the process time period of the filter process becomes 300 clocks, and the process time period of the enlargement process becomes 650 clocks in view of an enlargement factor 1.3 (i.e., the ratio of the number of output pixels to the number of input pixels). As a result, the first process time period of the reconfiguration process mode becomes 1850 clocks.

On the other hand, in FIG. 10, the process time period of the color conversion process becomes 300 clocks, the process time period of the filter process becomes 300 clocks, and the process time period of the enlargement process becomes 650 clocks. Therefore, a maximum value of the process time periods is 650 clocks. As a result, the second process time period of the pipeline process mode becomes 1950 clocks acquired by multiplying the maximum value "650 clocks" by three.

Therefore, the first process time period of the reconfiguration process mode is shorter than the second process time period of the pipeline process mode. Accordingly, the DRPs 61 to 63 operate by the reconfiguration process mode. Similarly, the DRPs 64 to 66 also operate by the reconfiguration process mode.

According to the reconfiguration process mode shown in FIG. 11, the function of the DRP 61 is switched, so that an image process A1 (e.g. the color conversion process), an image process B1 (e.g. the filter process), and an image process C1 (e.g. the enlargement processing) are realized. Similarly, the function of the DRP 62 is switched, so that image processes A2, B2, C2 are realized. The function of the DRP 63 is switched, so that image processes A3, B3, C3 are realized. The DRPs 61 to 63 operate in parallel, and hence the image processes A1 to A3 are completed during a primary processing time period of 300 clocks.

Next, after the overhead of 200 clocks has elapsed, the image processes A1 to A3 of the DRPs 61 to 63 are switched to the image processes B1 to B3, and the image processes B1 to B3 are completed during a next processing time period of 300 clocks. Similarly, after the overhead of 200 clocks has elapsed, the image processes B1 to B3 of the DRPs 61 to 63 are switched to the image processes C1 to C3, and the image processes C1 to C3 are completed during a next processing time period of 650 clocks. Thus, if the total of the processing time periods is 1850 clocks, the image processes A to C are completed, as shown in FIG. 11.

On the other hand, according to the pipeline process mode shown in FIG. 11, the processing time period "650 clocks" of the image process C in which the processing time period per one stage of the DRP is maximum becomes the basis for the calculation of the total of the processing time periods, and hence the total of the processing time periods "1950 clocks" is calculated by multiplying the processing time period "650 clocks" by three. In the pipeline process mode, when a previous image process is not completed, a next image process is not started. For example, the image process B1 waits until the image process A1 is completed. Similarly, the image process C1 waits until the image process B1 is completed. By these waiting, when the enlargement factor is 1.3, the process efficiency of the pipeline process mode decreases more than that of the reconfiguration process mode. Therefore, the total of the processing time periods of the pipeline process mode may increase, compared to that of the reconfiguration process mode in which the DRPs operate in parallel. According to the reconfiguration process mode, the waiting caused by fluctuation of the process time periods in the pipeline process mode can be solved.

Conversely, when the enlargement factor "1.3" shown in FIG. 10 is corrected to "1.1" in FIG. 12, the first process time period Y1 becomes 1750 clocks and the second process time period Y2 becomes 1650 clocks, by the method similar to the explanation mentioned above. Therefore, the total of the processing time periods of the pipeline process mode is shorter than that of the reconfiguration process mode. In this case, the DRPs 61 to 63 operate by the pipeline process mode. The DRPs 64 to 66 also operate by the pipeline process mode.

Specifically, when the DRPs 61 to 63 operate in parallel as shown in the reconfiguration process mode of FIG. 13, the total of the processing time periods is 1750 clocks. On the other hand, the total of the processing time periods in the pipeline process mode is 1650 clocks. In this case, even if the above-mentioned waiting is generated in the pipeline process mode, the process efficiency of the pipeline process mode improves more than that of the reconfiguration process mode, considering the overheads of the reconfiguration process mode. Thus, when the image processes are sequentially executed by the pipeline process mode, the image processes may be completed at short times, compared to the reconfiguration process mode in which the image process functions of the DRPs 61 to 63 are switched. Therefore, the image processes are effectively executed by switching both process modes, as desired.

Second Exemplary Embodiment

A description will now be given of a second exemplary embodiment of the present invention.

FIG. 14 is a diagram showing another example of calculating expressions of the first process time period and the second process time period. Expressions (3) and (4) shown in FIG. 14 are different from the expressions (1) and (2) shown in FIG. 9 described above in further considering the number of pages to be processed N and the number of pipeline stages D.

The first processing time period is calculated by the expression (3) shown in FIG. 14. According to the expression (3), the process time periods L1 to L3, each of which shows a process time period per one pixel, are multiplied by the number of pixels to be processed P1 to P3, each of which shows the number of pixels to be processed for each image process function, respectively. And then, the respective overheads are added to the results of the multiplication, and a value in which all the addition results are totaled is calculated. Further, a value acquired by multiplying the calculated value by the number of pages to be processed per one stage (i.e., N/D) becomes the first process time period Y1.

The second processing time period is calculated by the expression (4) shown in FIG. 14. According to the expression (4), the process time periods L1 to L3, each of which shows a process time period per one pixel, are multiplied by the number of pixels to be processed P1 to P3, each of which shows the number of pixels to be processed for each image process function, respectively. And then, a maximum value is selected from the results of the multiplication, and a value in which the selected maximum value is multiplied by the number of stages of the DRPs (e.g. three times) is calculated. Further, the calculated value is multiplied by the number of pages to be processed per one stage (i.e., N/D). The total of the result of the multiplication and values acquired by multiplying the process time periods L1 and L2 by the number of pixels to be processed P1 and P2, respectively, becomes the second process time period Y2. It should be noted that the values acquired by multiplying the process time periods L1 and L2 by the number of pixels to be processed P1 and P2, respectively are called "an initial time period".

Further, a description will now be given of concrete examples of the present exemplary embodiment, with reference to FIGS. 15 to 18.

FIG. 15 is a diagram showing another concrete example of the first process time period and the second process time when the reconfiguration process mode becomes advantageous. FIG. 16 is another schematic diagram when the reconfiguration process mode becomes advantageous. FIG. 17 is a diagram showing another concrete example of the first process time period and the second process time period when the pipeline process mode becomes advantageous. FIG. 18 is another schematic diagram when the pipeline process mode becomes advantageous.

For example, in the color conversion process shown in FIG. 15, the number of clocks requested for processing one pixel is 3 clocks. In this case, the input dependence flag is "0", and hence the process time period becomes "0" even if the number of input pixels is multiplied by the "L" (i.e., 3 clocks). However, since the output dependence flag is "1", the output dependence flag and the number of output pixels "100" is multiplied by the "L" (i.e., 3 clocks), so that the process time period becomes 300 clocks. Similarly, the process time period of the filter process becomes 300 clocks, and the process time period of the enlargement process becomes 650 clocks in view of an enlargement factor 1.3 (i.e., the ratio of the number of output pixels to the number of input pixels). In the present exemplary embodiment, the number of pages to be processed per one stage "30" (="90" pages/3 stages) is multiplied by the total of the process time periods of the above-mentioned image processes, for example. As a result, the first process time period of the reconfiguration process mode becomes 55500 clocks.

On the other hand, in FIG. 15, the process time period of the color conversion process becomes 300 clocks, the process time period of the filter process becomes 300 clocks, and the process time period of the enlargement process becomes 650 clocks. Therefore, a maximum value of the process time periods is 650 clocks. Then, the number of pages to be processed per one stage "30" (="90" pages/3 stages) is multiplied by 1950 clocks acquired by multiplying the maximum value "650 clocks" by three. As a result, the second process time period of the pipeline process mode becomes 59100 clocks.

Therefore, the first process time period of the reconfiguration process mode is shorter than the second process time period of the pipeline process mode. Accordingly, the DRPs 61 to 63 operate by the reconfiguration process mode. Similarly, the DRPs 64 to 66 also operate by the reconfiguration process mode.

According to the reconfiguration process mode shown in FIG. 16, the function of the DRP 61 is switched, so that the image process A1 (e.g. the color conversion process), the image process 131 (e.g. the filter process), and the image process C1 (e.g. the enlargement processing) are realized. Similarly, the function of the DRP 62 is switched, so that the image processes A2, B2, C2 are realized. The function of the DRP 63 is switched, so that the image processes A3, B3, C3 are realized. The DRPs 61 to 63 operate in parallel, and hence the image processes A1 to A3 are completed during a primary processing time period of 300 clocks.

Next, after the overhead of 200 clocks has elapsed, the image processes A1 to A3 of the DRPs 61 to 63 are switched to the image processes B1 to B3, and the image processes B1 to B3 are completed during a next processing time period of 300 clocks. Similarly, after the overhead of 200 clocks has elapsed, the image processes B1 to B3 of the DRPs 61 to 63 are switched to the image processes C1 to C3, and the image processes C1 to C3 are completed during a next processing time period of 650 clocks. Thus, if the number of pages to be processed is 90, and the total of the processing time periods is 55500 clocks, the image processes A to C are completed, as shown in FIG. 16.

On the other hand, according to the pipeline process mode shown in FIG. 16, the processing time period "650 clocks" of the image process C in which the processing time period per one stage of the DRP is maximum becomes the basis for the calculation of the total of the processing time periods, and hence the total of the processing time periods "1950 clocks" is calculated by multiplying the processing time period "650 clocks" by three. Further, the number of pages to be processed per one stage "30" is multiplied by the 1950 clocks, and then the result of the multiplication is added to the initial time period "600 clocks". Thus, if in the pipeline process mode, the number of pages to be processed is 90, and the total of the processing time periods is 59100 clocks, the image processes A to C are completed. That is, the total of the processing time periods of the pipeline process mode may increase, compared to that of the reconfiguration process mode in which the DRPs operate in parallel.

Conversely, when the enlargement factor "1.3" shown in FIG. 15 is corrected to "1.1" in FIG. 17, the first process time period Y1 becomes 52500 clocks and the second process time period Y2 becomes 50100 clocks, by the method similar to the explanation mentioned above. Therefore, the total of the processing time periods of the pipeline process mode is shorter than that of the reconfiguration process mode. In this case, the DRPs 61 to 63 operate by the pipeline process mode. The DRPs 64 to 66 also operate by the pipeline process mode.

Specifically, when the DRPs 61 to 63 operate in parallel as shown in the reconfiguration process mode of FIG. 18, if the number of pages to be processed is 90, the total of the processing time periods is 52500 clocks. On the other hand, the total of the processing time periods in the pipeline process mode is 50100 clocks. Thus, when the image processes are sequentially executed by the pipeline process mode, the image processes may be completed at short times, compared to the reconfiguration process mode in which the image process functions of the DRPs 61 to 63 are switched.

Thus, in the present exemplary embodiment, when the first process time period and the second process time period are calculated, the initial time period and the number of pages to be processed are considered. As a result, in the comparison of the first process time period and the second process time period, the comparative accuracy of the present exemplary embodiment improves more than that of the first exemplary embodiment.

In the present exemplary embodiment, when the number of pages to be processed increases, the process time period requested for the above-mentioned image process C increases. As a result, the process time periods requested for the image processes A and B executed before the image process C relatively and vanishingly shortens, compared to the process time period requested for the image process C. On the other hand, in the first exemplary embodiment, the initial time period and the number of pages to be processed are disregarded. In the first exemplary embodiment, the calculation of the first process time period and the second process time period does not become complex, but is simplified, compared to the second exemplary embodiment.

The image process is not limited to the above-mentioned image processes. For example, the image process may be a rotation process, a JPEG (Joint Photographic Experts Group) expansion process, a tone correction process, a tone reproduction control process, a screen process, or the like. For example, the process time calculation processes (steps S1 and S2 in FIG. 8) and the mode judgment based on the result of the calculation (steps S3 to S5 in FIG. 8) may be executed for each print job, or for each page.

When the operation of the CPU 32 in FIG. 8 is executed for each print job, the CPU 32 determines all the content of the image process (e.g. the color conversion process, the filter process, or the like) in the print job in generating the print job, and divides pages included in the print job into groups. When the operation of the CPU 32 in FIG. 8 is executed for each page, the CPU 32 determines immediately prior to printing of each page whether each page corresponds to one of continuous pages corresponding to the pipeline stage, and switches the image process when it is determined that each page does not correspond to one of continuous pages corresponding to the pipeline stage.

For example, when the CPU 32 receives a print job including a catalog with photographs having 90 pages in which the enlargement factor is 1.3, and then another catalog with photographs having 90 pages in which the enlargement factor is 1.1, the DRPs 61 to 66 operate by the reconfiguration process mode, and the pages from first page to 90th page are printed, as described in the first and second exemplary embodiments. Then, the DRPs 61 to 66 operate by the pipeline process mode, and the pages from 91st page to 180th page are printed. Especially, when a large amount of pages having a similar style are printed, a more high-speed process mode is selected from the reconfiguration process mode and the pipeline process mode, and those pages are printed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
   a calculation portion that calculates a first process time period and a second process time period based on the number of pixels of image information of an input print job and contents of processes of the input print job,
      the first process time period being utilized where image processes are executed by a reconfiguration process mode,
         the reconfiguration process mode causing each of a plurality of dynamic reconfigurable processors (DRP) to fulfill different image process functions by sequentially switching the image process functions in a same order, and executing a plurality of image processes to image information, and
      the second process time period being utilized where the image processes are executed by a pipeline process mode,
         the pipeline process mode causing each of the plurality of DRPs to fulfill different image process functions at a time, and sequentially executing a plurality of image processes to the image information by outputting the image information that the image process has completed to the next DRP; and
   an activation portion that activates the plurality of DRPs according to the reconfiguration process mode when the first process time period is shorter than the second process time period, and activates the plurality of DRPs according to the pipeline process mode when the second process time period is equal to or shorter than the first process time period;
   wherein, in the pipeline process mode, a new image process is not started until a previous image process has completed.

2. The image processing apparatus according to claim 1, wherein the calculation portion calculates the first process time period based on further a time period requested for switching image process functions of the DRPs.

3. The image processing apparatus according to claim 1, wherein the calculation portion calculates a first calculation value which is a maximum value in values acquired by multiplying the number of output pixels by process time periods per one pixel by functions of the DRPs, and calculates a second calculation value as the second process time period by multiplying the first calculation value by the number of functions of image processes requested by the input print job.

4. The image processing apparatus according to claim 2, wherein the calculation portion calculates a first calculation value which is a maximum value in values acquired by multiplying the number of output pixels by process time periods per one pixel by functions of the DRPs, and calculates a second calculation value as the second process time period by multiplying the first calculation value by the number of functions of image processes requested by the input print job.

5. The image processing apparatus according to claim 3, wherein when an initial time period of the pipeline process mode is included, the calculation portion calculates the first process time period and the second process time period based on further the number of pages to be image-processed and the number of stages of the DRPs activated by the pipeline process mode.

6. The image processing apparatus according to claim 4, wherein when an initial time period of the pipeline process mode is included, the calculation portion calculates the first process time period and the second process time period based on further the number of pages to be image-processed and the number of stages of the DRPs activated by the pipeline process mode.

7. An image forming system comprising:
   an image processing apparatus including:
      a calculation portion that calculates a first process time period and a second process time period based on the number of pixels of image information of an input print job and contents of processes of the input print job,
         the first process time period being utilized where image processes are executed by a reconfiguration process mode,
            the reconfiguration process mode causing each of a plurality of dynamic reconfigurable processors (DRP) to fulfill different image process functions by sequentially switching the image process functions in a same order, and executing a plurality of image processes to image information, and
         the second process time period being utilized where the image processes are executed by a pipeline process mode,
            the pipeline process mode causing each of the plurality of DRPs to fulfill different image process functions at a time, and sequentially executing a plurality of image processes to the image information by outputting the image information that the image process has completed to the next DRP;
      an activation portion that activates the plurality of DRPs according to the reconfiguration process mode when the first process time period is shorter than the second process time period, and activates the plurality of DRPs according to the pipeline process mode when the second process time period is equal to or shorter than the first process time period;
   an outputting apparatus that outputs the print job to the image processing apparatus; and
   a forming apparatus that forms an image on a recording medium according to image information output from the image processing apparatus,
   wherein, in the pipeline process mode, a new image process is not started until a previous image process has completed.

8. A non-transitory computer readable medium causing a computer to execute a process, the process comprising:
   calculating a first process time period and a second process time period based on the number of pixels of image information of an input print job and contents of processes of the input print job, the first process time period being utilized where image processes are executed by a reconfiguration process mode, the reconfiguration process mode causing each of a plurality of dynamic reconfigurable processors (DRP) to fulfill different image process functions by sequentially switching the image process functions in a same order, and executing a plurality of image processes to image information, and the second process time period being utilized where the image processes are executed by a pipeline process mode, the pipeline process mode causing each of the plurality of DRPs to fulfill different image process functions at a time, and sequentially executing a plurality of image processes to the image information by outputting the image information that the image process has completed to the next DRP; and activating the plurality of DRPs according to the reconfiguration process mode when the first process time period is shorter than the second process time period, and activates the plurality of DRPs according to the pipeline process mode when the second process time period is equal to or shorter than the first process time period;

wherein, in the pipeline process mode, a new image process is not started until a previous image process has completed.

9. The image processing apparatus according to claim 1, wherein the image processes performed by each of the plurality of dynamically reconfigurable processors includes at least one of a color conversion process, a filter process, and an enlargement process.

* * * * *